UNITED STATES PATENT OFFICE.

REINHOLD FREIHERR von WALTHER, OF DRESDEN, GERMANY, ASSIGNOR TO T. D. BIEDEL ACTIENGESELLSCHAFT, OF BERLIN, GERMANY.

PROCESS FOR THE PRODUCTION OF ANTISEPTICALLY-ACTING BODIES.

1,144,270.   Specification of Letters Patent.   Patented June 22, 1915.

No Drawing.   Application filed March 16, 1914.   Serial No. 825,187.

*To all whom it may concern:*

Be it known that I, REINHOLD FREIHERR VON WALTHER, professor, a subject of the Emperor of Germany, and residing at 15 Muenchenerstrasse, Dresden, Saxony, Germany, have invented certain new and useful Improvements in Processes for the Production of Antiseptically-Acting Bodies, of which the following is a specification.

The 6-halogen-1-methyl-3-oxybenzol-4-carboxylic-acids have hitherto been produced only according to a single exceedingly complicated and technically impracticable process (compare *Berliner Berichte* 26, (1893) page 1851). The products themselves have remained entirely unnoticed.

I have now made the surprising discovery that the mono-halogen substitution products of the metacresotinic acid possess strong antiseptic properties which is the more surprising as these properties are not possessed by the meta-cresotinic acid which up to now has not been used therapeutically. A further advantage of the mono-halogen products consists in the very slight degree in which they are poisonous. It has been found for example by comparative experiments that the 6-chloro-1-methyl-3-oxybenzol-4-carboxylic-acid is twice to four times less poisonous than salicylic acid. This again was not before seen because of the cresotinic acids according to Fränkel (*Arzneimittel-synthese*, 1912, page 229) are more poisonous than salicylic acid. By the process hereinafter described I have been enabled to produce this valuable disinfectant without difficulty.

By using the Kolbe-Schmidt process, the p-chloro-m-cresol (OH : CH$_3$ : Cl=3:1:6) is extremely readily converted into the 6-chloro-1-methyl-3-oxybenzol-4-carboxylic-acid. Whereas theoretically the formation of 2 isomeric mono-carboxylic acids from p-chloro-m-cresol was to be expected, it is surprising that only a single uniform acid was obtained in an almost quantitative yield.

Example: Dry p-chloro-m-sodium-cresolate is heated in autoclaves at a pressure of about five atmospheres for six hours in an atmosphere of carbon di-oxid to about 160° C. When heated over 180° C. the mass is charred. The product obtained is dissolved in boiling water and filtered and this 6-chloro-1-methyl-3-oxybenzol-4-carboxylic-acid is precipitated by means of diluted hydro-chloric acid in the form of a light crystalline powder. For a further purification the acid may be re-crystallized from aqueous alcohol. From water it is crystalized in microscopical needle-shaped bodies and from alcohol in flat prismatic crystals. Its melting point is at 205° C.

I claim:—

1. The process of producing antiseptic 6-halogen-1-methyl-3-oxybenzol-4-carboxylic acid which comprises heating 6-halogen-3-sodium-cresolate with carbon dioxid under pressure to relatively high temperatures.

2. The process of producing antiseptic 6-chloro-3-oxybenzol-4-carboxylic acid which comprises heating 6-chloro-3-sodium cresolate with carbon dioxid under pressure to relatively high temperatures.

3. The process of producing antiseptic 6-chloro-3-oxybenzol-4-carboxylic acid which comprises heating 6-chloro-3-sodium cresolate with carbon dioxid under pressure to a temperature of about 160° C.

4. The process of producing antiseptic 6-chloro-1-methyl-3-oxybenzol-4-carboxylic acid which comprises heating dry para-chloro-meta-sodium-cresolate at a pressure of about five atmospheres in an atmosphere of carbon dioxid to a temperature of about 160° C.

In testimony whereof I have signed my name to this specification in the presence of two subscribing witnesses.

REINHOLD FREIHERR VON WALTHER.

Witnesses:
  LEO A. BERGHOLZ,
  PAUL ARRAS.

Copies of this patent may be obtained for five cents each, by addressing the "Commissioner of Patents, Washington, D. C."

It is hereby certified that the name of the assignee in Letters Patent No. 1,144,270, granted June 22, 1915, upon the application of Reinhold Freiherr von Walther, of Dresden, Germany, for an improvement in "Processes for the Production of Antiseptically-Acting Bodies," was erroneously written and printed as "T. D. Biedel Actiengesellschaft," whereas said name should have been written and printed *I. D. Riedel Actiengesellschaft;* and that the said Letters Patent should be read with this correction therein that the same may conform to the record of the case in the Patent Office.

Signed and sealed this 2nd day of November, A. D., 1915.

[SEAL.]

R. F. WHITEHEAD,
*Acting Commissioner of Patents.*